United States Patent [19]
Schreib

[11] Patent Number: 6,017,652
[45] Date of Patent: Jan. 25, 2000

[54] BATTERY SIDE COVER

[76] Inventor: Gary F. Schreib, 2189 Carter Rd., Fairport, N.Y. 14450

[21] Appl. No.: 08/953,895

[22] Filed: Oct. 20, 1997

[51] Int. Cl.[7] .............................. H01M 2/02; H01M 2/00
[52] U.S. Cl. .......................... 429/175; 429/100; 429/96; 429/163; 429/123; 429/180; 180/68.5; D12/114; D12/126
[58] Field of Search .............................. 429/100, 96, 175, 429/163, 123, 180; 180/68.5; D12/114, 126

[56] References Cited

U.S. PATENT DOCUMENTS

| | | | |
|---|---|---|---|
| 1,554,300 | 9/1925 | Sellers | 180/68.5 |
| 2,349,031 | 5/1944 | Doughty | 429/175 |
| 2,405,251 | 4/1944 | Glaze | 180/68.5 |

OTHER PUBLICATIONS

1995 Harley Davidson Genuine Parts & Accessories, pp. 151–152, Harley Davidson motorcylcles, 1995 no month available.

*Primary Examiner*—Maria Nuzzolillo
*Assistant Examiner*—Tracy Dove
*Attorney, Agent, or Firm*—Harter, Secrest & Emery LLP; Brian B Shaw

[57] ABSTRACT

A battery side cover for a Harley Davidson™ Sportster™ model motorcycle which enables an owner/operator to easily and inexpensively modify his Harley Davidson™ motorcycle to replicate the look of a Harley Davidson™ Big Twine™. The battery side cover includes a bracket for attaching the side cover to the frame of the motorcycle. The bracket allows for easy installation with minor mechanical adjustments.

8 Claims, 3 Drawing Sheets

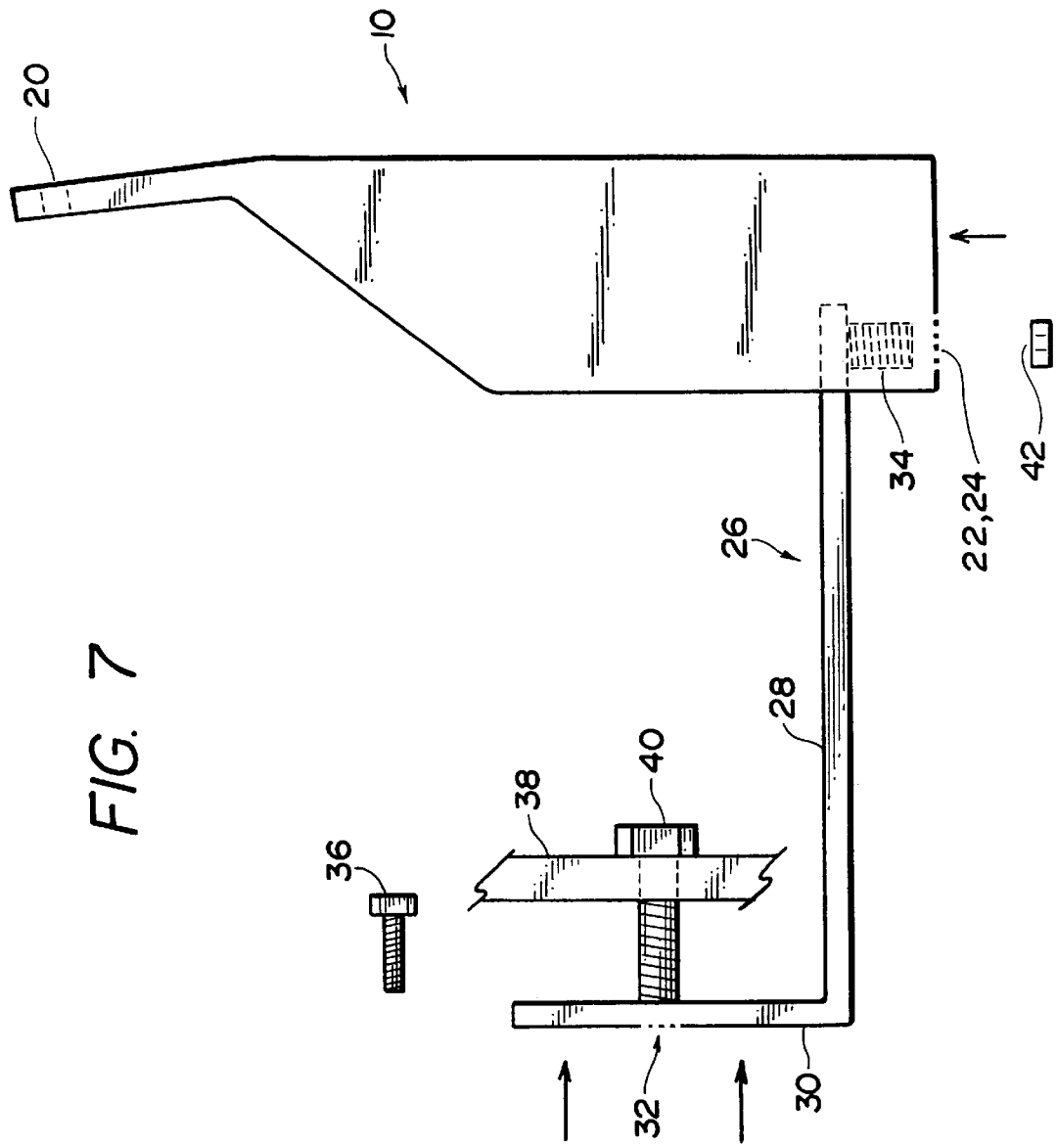

BATTERY SIDE COVER

FIELD OF THE INVENTION

The present invention relates to battery side covers or more specifically, battery side covers for Harley Davidson™ Sportster™ motorcycles.

BACKGROUND OF THE INVENTION

Harley Davidson™ motorcycles are at the height of their popularity. The use of the motorcycles for pleasure and showmanship are ever increasing. People enjoy the ride, the sound, and the status that a Harley Davidson™ motorcycle provides the operator. Harley Davidson sells a number of different motorcycles, which have various looks and performance capabilities. The more elaborate the appearance of the bike and the more performance the bike has, the more expensive it may be. Many people, who cannot afford a new, larger and more expensive motorcycle, may customize their motorcycle to appear as if it was a larger model. Such customization may include different accessories, such as seats, running boards, painting, mirrors, and so on.

The customization of motorcycles is an expanding and increasingly lucrative industry. Many new and resourceful ways of adding accessories onto a motorcycle are being developed. However, none of the customizations allow an individual to customize their battery side panel of their Harley Davidson™ Sportster™ motorcycle to have the appearance of a Big Twin™ model Harley Davidson™ motorcycle. Further, many customizations are extremely expensive and time consuming. Some customizations may actually exceed the initial price of the desired motorcycle. There is a need for customization in which a fairly easy and inexpensive process may be undertaken to customize the appearance of the battery side cover to replicate the look of the Big Twin™ model Harley Davidson® motorcycle.

BRIEF DESCRIPTION OF THE DRAWINGS

FIG. 7 is a top view of the assembly.

SUMMARY OF THE INVENTION

The present invention is a battery side cover for a Harley Davidson™ motorcycle comprising a side cover having a front plate; a depending top plate and a depending back plate; the top plate being non-planar; and predetermined apertures in the back plate and the front plate. Further, the invention includes a cover bracket for a Harley Davidson™ motorcycle, comprising a planar body; a depending 90° angle hanger; and at least one depending stud.

DETAILED DESCRIPTION OF THE INVENTION

The present invention includes a battery side cover for a Harley Davidson™ Sportster™ motorcycle to replicate the appearance of the Big Twin™ model motorcycle. Preferably, the Harley Davidson motorcycles are the model years 1983 and later.

Figure 2:
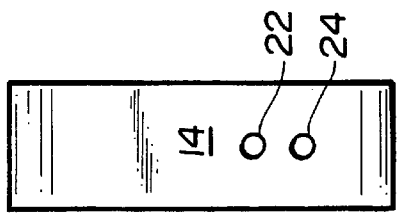
FIG. 2 is a side view of the cover.
Figure 1:
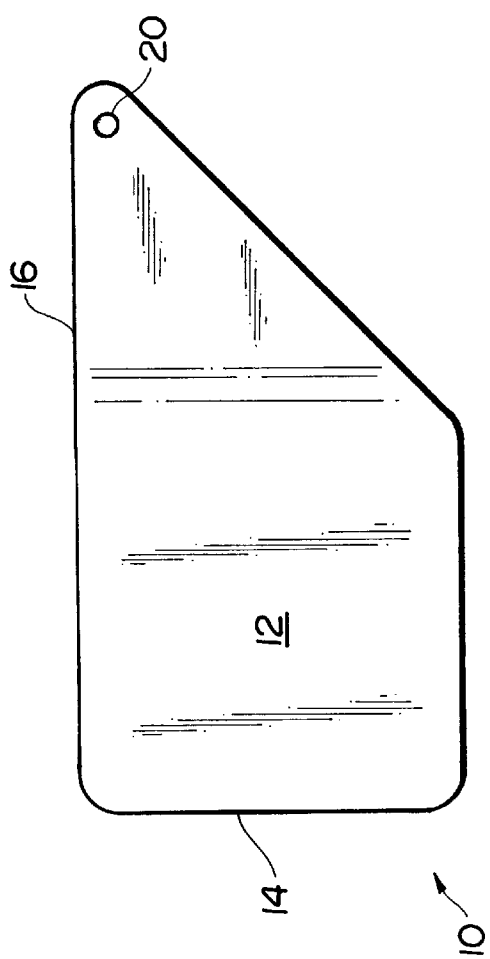
FIG. 1 is front planar view of the battery cover.
Figure 3:
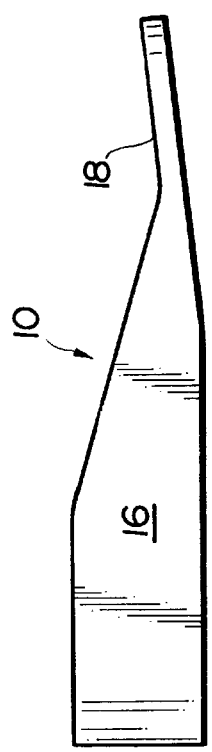
FIG. 3 is a top view of the cover.
Figure 4:
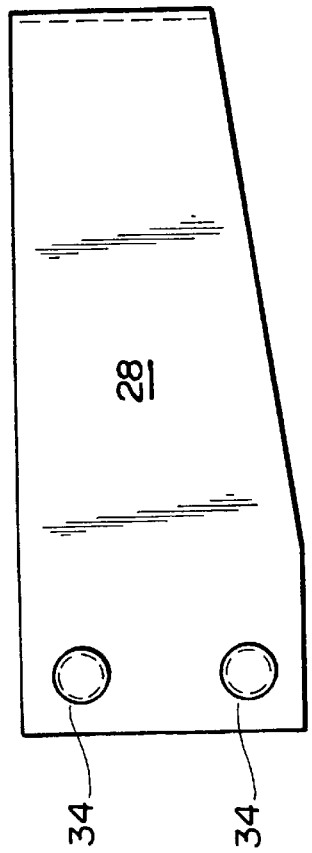
FIG. 4 is a elevational view of the bracket.
Figure 5:
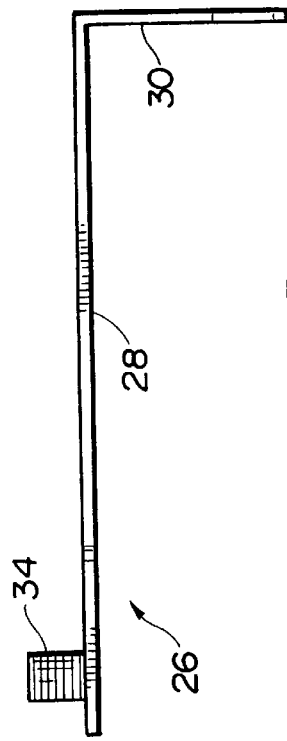
FIG. 5 is a top view of the bracket.
Figure 6:
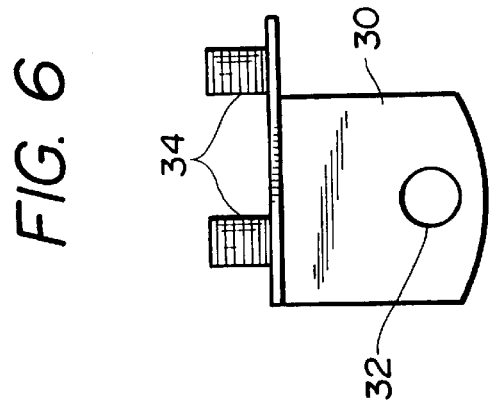
FIG. 6 is a side view of the bracket.

The battery cover 10, as shown in FIGS. 1, 2, and 3, includes a front plate 12, a depending back plate 14 and a depending top plate 16. The front plate 12 is non planar; that is, a section 18 of the front plate 12 deviates from the plane to securely attach to the motorcycle frame. The advantage of the present invention is that preexisting bolts and bracketry in the motorcycle's frame may be used to securely attach the side cover 10. Therefore, it is very simple and easy to attach the side cover 10 to an existing Harley Davidson™, preferably Sportster™ model, motorcycle. Back plate 14 is preferably bent at a 90° angle from the front plate 12. Further, top plate 16 is preferably bent at a 90° angle from the front plate 12. The front plate 12 includes an aperture 20 to allow easy insertion of a bolt (not shown) to securely mount the cover on a Harley Davidson™, preferably Sportster™, motorcycle frame.

Back plate 14 also includes two apertures 22 and 24 in predetermined locations to allow easy insertion of bolts (not shown) into the apertures and through the bracket 26. As shown in FIGS. 4, 5, 6 and 7, bracket 26 includes plate 28 with hanger 30 depending from plate 28 at a 90° angle. Hanger 30 has an aperture 32 to allow insertion of a bolt (not shown) through it to securely mount the bracket to the frame of a motorcycle (not shown). Further, plate 28 includes two depending studs or bolts 34 which may protrude through the predetermined apertures 22 and 24 on the back plate 14. The protrusion of studs 34 through the apertures 22 and 24 allow secure mounting of the cover 10 onto the bracket 26 and the bracket onto the frame of the motorcycle. The bracket can be easily installed on a Harley Davidson™ motorcycle, preferably the Harley Davidson™ XL model.

To install the side cover, bolt 36 is removed from the battery tray 38 and replaced with a longer bolt 40, preferably a bolt which is ¾ in. longer than the first bolt. The bolt 40 protrudes beyond the surface of the battery tray, preferably approximately ¾ in Hanger 30 is attached to the frame by inserting bolt 40 through aperture 32 and securely fastening with a lock washer and nut (not shown). In this configuration, the L-shaped hanger 30 is parallel to one side of the battery tray and has a 90 degree bend. Bolts 34 depend away from the battery tray 38. The cover is then attached by inserting the bolts 34 into the appropriate apertures and securely fastening with nuts 42, preferably chrome or cadmium plated. The aperture 20 in the upper right hand corner of the cover 10 fits into an existing frame mount on the motorcycle.

Studs 34 are preferably 0.25 in.×20 thread×0.375 in. long. Preferably, aperture 32 is 0.375 in. Further, apertures 22 and 24 are preferably ⁵⁄₁₆ inch while aperture 20 is 0.375 inch. The top plate deviates from the plane of the front plate of the cover preferably in a range of approximately 3 to 6 degrees, more preferably, 4 to 5 degrees and most preferably 4.5 degrees.

The cover and bracket may be comprised of any suitable material, such as metal, plastic or, preferably, steel. The cover may be painted or etched with any design that the owner/operator desires. Further, the side cover 10, with its unique design, can only be placed in a correct position. Therefore, any individual trying to retrofit his own personal Harley Davidson™ motorcycle will not err and misplace the side cover 10.

While the present invention has been shown in the drawings and fully described above with particularity in detail in connection with what is presently deemed to be the most practical and preferred embodiments of the invention, it will be apparent to those of ordinary skill in the art that many modifications thereof may be made without departing from the principals and concepts set forth herein. Hence, the proper scope of the present invention should be determined only by the broadest interpretation of the appended claims so as to encompass all such modifications and equivalents.

I claim:

1. A battery cover for a motorcycle comprising:
   (a) a front plate having a trapezoidal periphery; the front plate having at least one substantially circular aperture;
   (b) a depending top plate connected to the front plate; the top plate being non-planar with the front plate;
   (c) a depending back plate connected to the front plate and including at least one aperture; and
   (d) a bracket including a body and a hanger.

2. The battery cover as defined in claim 1 further comprising a second aperture in the back plate.

3. The battery cover as defined in claim 1 wherein the hanger depends from the body at a 90° angle.

4. The battery cover as defined in claim 1 wherein the body is planar.

5. The battery cover as defined in claim 1 wherein the top plate deviates from the plane of the front plate in a range of approximately 3 to 6 degrees.

6. The battery cover as defined in claim 1 wherein the cover includes a first planar portion adjacent the back plate and a second planar portion intersecting the first planar portion.

7. The battery cover as defined in claim 1 wherein the top plate deviates 4.5 degrees from the plane of the front plate.

8. The battery cover as defined in claim 1 wherein the trapezoidal periphery of the cover includes a pair of parallel sides and an interconnecting side the aperture located adjacent an intersection of the interconnecting side and one of the parallel sides.

* * * * *